(12) United States Patent
Gregoire et al.

(10) Patent No.: US 7,307,589 B1
(45) Date of Patent: Dec. 11, 2007

(54) LARGE-SCALE ADAPTIVE SURFACE SENSOR ARRAYS

(75) Inventors: Daniel Gregoire, Thousand Oaks, CA (US); Cameron G. Massey, Hawthorne, CA (US); Daniel F. Sievenpiper, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 47 days.

(21) Appl. No.: 11/324,064

(22) Filed: Dec. 29, 2005

(51) Int. Cl.
*H01Q 1/38* (2006.01)
(52) U.S. Cl. ............................... 343/700 MS; 343/853
(58) Field of Classification Search ......... 343/700 MS, 343/909, 754, 853
See application file for complete search history.

(56) References Cited

U.S. PATENT DOCUMENTS

| | | | |
|---|---|---|---|
| 3,267,480 A | 8/1966 | Lerner | 343/911 |
| 3,560,978 A | 2/1971 | Himmel et al. | 343/106 |
| 3,810,183 A | 5/1974 | Krutsinger et al. | 343/708 |
| 3,961,333 A | 6/1976 | Purinton | 343/872 |
| 4,045,800 A | 8/1977 | Tang et al. | 343/854 |
| 4,051,477 A | 9/1977 | Murphy et al. | 343/700 MS |
| 4,119,972 A | 10/1978 | Fletcher et al. | 343/844 |
| 4,123,759 A | 10/1978 | Hines et al. | 343/854 |
| 4,124,852 A | 11/1978 | Steudel | 343/854 |
| 4,127,586 A | 11/1978 | Rody et al. | 260/300 B |
| 4,150,382 A | 4/1979 | King | 343/754 |
| 4,173,759 A | 11/1979 | Bakhru | 343/100 |
| 4,189,733 A | 2/1980 | Malm | 343/100 SA |
| 4,217,587 A | 8/1980 | Jacomini | 343/100 SA |
| 4,220,954 A | 9/1980 | Marchland | 343/113 R |
| 4,236,158 A | 11/1980 | Daniel | 343/100 LE |
| 4,242,685 A | 12/1980 | Sanford | 343/770 |
| 4,266,203 A | 5/1981 | Saudreau et al. | 333/21 A |
| 4,308,541 A | 12/1981 | Frosch et al. | 343/786 |
| 4,367,475 A | 1/1983 | Schiavone | 343/767 |

(Continued)

FOREIGN PATENT DOCUMENTS

DE 196 00 609 A1 4/1997

(Continued)

OTHER PUBLICATIONS

Balanis, C., "Aperture Antennas," *Antenna Theory, Analysis and Design*, 2nd Edition, Ch. 12, pp. 575-597 (1997).

(Continued)

*Primary Examiner*—Hoang V. Nguyen
(74) *Attorney, Agent, or Firm*—Ladas & Parry (57) ABSTRACT

An adaptive surface has a dielectric surface with a repeating pattern of electrically conductive structures disposed thereon or therein, the dielectric surface in combination with repeating pattern of electrically conductive structures forming a metasurface for binding surface waves thereto. A plurality of actuators on the dielectric surface alter the shape of the metasurface in response to control signals. A plurality of sensors on the dielectric surface for measuring a desired parameter and converting it to data. A plurality of rectennae disposed on the dielectric surface for providing electrical power to said actuators and to said sensors. A plurality of data antennas are disposed on or in the dielectric surface, the data antennas being coupled with data receivers and data transmitters for receiving data from an external source for controlling the actuators and for transmitting data from said sensors to an external receiver.

18 Claims, 7 Drawing Sheets

U.S. PATENT DOCUMENTS

| | | | |
|---|---|---|---|
| 4,370,659 A | 1/1983 | Chu et al. | 343/772 |
| 4,387,377 A | 6/1983 | Kandler | 343/756 |
| 4,395,713 A | 7/1983 | Nelson et al. | 343/713 |
| 4,443,802 A | 4/1984 | Mayes | 343/729 |
| 4,590,478 A | 5/1986 | Powers et al. | 343/700 MS |
| 4,594,595 A | 6/1986 | Struckman | 343/770 |
| 4,672,386 A | 6/1987 | Wood | 343/770 |
| 4,684,953 A | 8/1987 | Hall | 343/725 |
| 4,700,197 A | 10/1987 | Milne | 343/837 |
| 4,737,795 A | 4/1988 | Nagy et al. | 343/712 |
| 4,749,996 A | 6/1988 | Tresselt | 343/700 MS |
| 4,760,402 A | 7/1988 | Mizuno et al. | 343/713 |
| 4,782,346 A | 11/1988 | Sharma | 343/795 |
| 4,803,494 A | 2/1989 | Norris et al. | 343/770 |
| 4,821,040 A | 4/1989 | Johnson et al. | 343/700 MS |
| 4,835,541 A | 5/1989 | Johnson et al. | 343/713 |
| 4,843,400 A | 6/1989 | Tsao et al. | 343/700 MS |
| 4,843,403 A | 6/1989 | Lalezari et al. | 343/767 |
| 4,853,704 A | 8/1989 | Diaz et al. | 343/767 |
| 4,903,033 A | 2/1990 | Tsao et al. | 343/700 MS |
| 4,905,014 A | 2/1990 | Gonzalez et al. | 343/909 |
| 4,916,457 A | 4/1990 | Foy et al. | 343/770 |
| 4,922,263 A | 5/1990 | Dubost et al. | 343/797 |
| 4,958,165 A | 9/1990 | Axford et al. | 343/770 |
| 4,975,712 A | 12/1990 | Chen | 343/754 |
| 5,021,795 A | 6/1991 | Masiulis | 343/700 MS |
| 5,023,623 A | 6/1991 | Kreinheder et al. | 343/725 |
| 5,070,340 A | 12/1991 | Diaz | 343/767 |
| 5,081,466 A | 1/1992 | Bitter, Jr. | 343/767 |
| 5,115,217 A | 5/1992 | McGrath et al. | 333/246 |
| 5,146,235 A | 9/1992 | Frese | 343/895 |
| 5,158,611 A | 10/1992 | Ura et al. | 106/499 |
| 5,208,603 A | 5/1993 | Yee | 343/909 |
| 5,218,374 A | 6/1993 | Koert et al. | 343/789 |
| 5,235,343 A | 8/1993 | Audren et al. | 343/816 |
| 5,268,696 A | 12/1993 | Buck et al. | 342/372 |
| 5,268,701 A | 12/1993 | Smith | 343/767 |
| 5,278,562 A | 1/1994 | Martin et al. | 342/1 |
| 5,287,116 A | 2/1994 | Iwasaki et al. | 343/700 MS |
| 5,287,118 A | 2/1994 | Budd | 343/909 |
| 5,402,134 A | 3/1995 | Miller et al. | 343/742 |
| 5,406,292 A | 4/1995 | Schnetzer et al. | 343/700 MS |
| 5,519,408 A | 5/1996 | Schnetzer | 343/767 |
| 5,525,954 A | 6/1996 | Komazaki et al. | 333/219 |
| 5,531,018 A | 7/1996 | Saia et al. | 29/622 |
| 5,532,709 A | 7/1996 | Talty | 343/819 |
| 5,534,877 A | 7/1996 | Sorbello et al. | 343/700 MS |
| 5,541,614 A | 7/1996 | Lam et al. | 343/792.5 |
| 5,557,291 A | 9/1996 | Chu et al. | 343/725 |
| 5,581,266 A | 12/1996 | Peng et al. | 343/770 |
| 5,589,845 A | 12/1996 | Yandrofski et al. | 343/909 |
| 5,598,172 A | 1/1997 | Chekroun | 343/754 |
| 5,600,325 A | 2/1997 | Whelan et al. | 342/13 |
| 5,611,940 A | 3/1997 | Zettler | 73/514.16 |
| 5,619,365 A | 4/1997 | Rhoads et al. | 359/248 |
| 5,619,366 A | 4/1997 | Rhoads et al. | 359/248 |
| 5,621,571 A | 4/1997 | Bantli et al. | 359/529 |
| 5,638,946 A | 6/1997 | Zavracky | 200/181 |
| 5,644,319 A | 7/1997 | Chen et al. | 343/702 |
| 5,694,134 A | 12/1997 | Barnes | 343/700 |
| 5,709,245 A | 1/1998 | Miller | 137/625.64 |
| 5,721,194 A | 2/1998 | Yandrofski et al. | 505/210 |
| 5,767,807 A | 6/1998 | Pritchett | 342/374 |
| 5,808,527 A | 9/1998 | De Los Santos | 333/205 |
| 5,874,915 A | 2/1999 | Lee et al. | 342/375 |
| 5,892,485 A | 4/1999 | Glabe et al. | 343/789 |
| 5,894,288 A | 4/1999 | Lee et al. | 343/770 |
| 5,905,465 A | 5/1999 | Olson et al. | 343/700 MS |
| 5,923,303 A | 7/1999 | Schwengler et al. | 343/853 |
| 5,926,139 A | 7/1999 | Korisch | 343/702 |
| 5,929,819 A | 7/1999 | Grinberg | 343/754 |
| 5,943,016 A | 8/1999 | Snyder, Jr. et al. | 343/700 MS |
| 5,945,951 A | 8/1999 | Monte et al. | 343/700 MS |
| 5,949,382 A | 9/1999 | Quan | 343/767 |
| 5,966,096 A | 10/1999 | Brachat | 343/700 MS |
| 5,966,101 A | 10/1999 | Haub et al. | 343/767 |
| 6,005,519 A | 12/1999 | Burns | 343/700 MS |
| 6,005,521 A | 12/1999 | Suguro et al. | 343/700 MS |
| 6,008,770 A | 12/1999 | Sugawara | 343/767 |
| 6,016,125 A | 1/2000 | Johansson | 343/702 |
| 6,028,561 A | 2/2000 | Takei | 343/767 |
| 6,028,692 A | 2/2000 | Rhoads et al. | 359/245 |
| 6,034,644 A | 3/2000 | Okabe et al. | 343/767 |
| 6,034,655 A | 3/2000 | You | 345/60 |
| 6,037,905 A | 3/2000 | Koscica et al. | 343/701 |
| 6,040,803 A | 3/2000 | Spall | 343/700 MS |
| 6,046,655 A | 4/2000 | Cipolla | 333/137 |
| 6,046,659 A | 4/2000 | Loo et al. | 333/362 |
| 6,054,659 A | 4/2000 | Lee et al. | 200/181 |
| 6,055,079 A | 4/2000 | Hagans et al. | 398/111 |
| 6,061,025 A | 5/2000 | Jackson et al. | 343/700 MS |
| 6,075,485 A | 6/2000 | Lilly et al. | 343/700 MS |
| 6,081,235 A | 6/2000 | Romanofsky et al. | 343/700 MS |
| 6,081,239 A | 6/2000 | Sabet et al. | 343/753 |
| 6,097,263 A | 8/2000 | Mueller et al. | 333/17.1 |
| 6,097,343 A | 8/2000 | Goetz et al. | 343/708 |
| 6,118,406 A | 9/2000 | Josypenko | 343/700 MS |
| 6,118,410 A | 9/2000 | Nagy | 343/713 |
| 6,127,908 A | 10/2000 | Bozler et al. | 333/246 |
| 6,150,989 A | 11/2000 | Aubry | 343/767 |
| 6,154,176 A | 11/2000 | Fathy et al. | 343/700 MS |
| 6,166,705 A | 12/2000 | Mast et al. | 343/853 |
| 6,175,337 B1 | 1/2001 | Jasper, Jr. et al. | 343/770 |
| 6,175,723 B1 | 1/2001 | Rothwell, III | 455/63 |
| 6,188,369 B1 | 2/2001 | Okabe et al. | 343/767 |
| 6,191,724 B1 | 2/2001 | McEwan | 342/21 |
| 6,198,438 B1 | 3/2001 | Herd et al. | 343/700 MS |
| 6,198,441 B1 | 3/2001 | Okabe et al. | 343/702 |
| 6,204,819 B1 | 3/2001 | Hayes et al. | 343/702 |
| 6,218,912 B1 | 4/2001 | Mayer | 333/106 |
| 6,218,997 B1 | 4/2001 | Lindenmeier et al. | 343/725 |
| 6,246,377 B1 | 6/2001 | Aiello et al. | 343/700 |
| 6,252,473 B1 | 6/2001 | Ando | 333/105 |
| 6,285,325 B1 | 9/2001 | Nalbandian et al. | 343/700 MS |
| 6,297,579 B1 | 10/2001 | Martin et al. | 310/330 |
| 6,307,519 B1 | 10/2001 | Livingston et al. | 343/767 |
| 6,317,095 B1 | 11/2001 | Teshirogi et al. | 343/785 |
| 6,323,826 B1 | 11/2001 | Sievenpiper et al. | 343/909 |
| 6,331,257 B1 | 12/2001 | Loo et al. | 216/13 |
| 6,337,668 B1 | 1/2002 | Ito et al. | 343/833 |
| 6,366,254 B1 | 4/2002 | Sievenpiper et al. | 343/700 |
| 6,373,349 B2 | 4/2002 | Gilbert | 333/126 |
| 6,380,895 B1 | 4/2002 | Moren et al. | 343/700 MS |
| 6,388,631 B1 | 5/2002 | Livingston et al. | 343/767 |
| 6,392,610 B1 | 5/2002 | Braun et al. | 343/876 |
| 6,404,390 B2 | 6/2002 | Sheen | 343/700 MS |
| 6,404,401 B2 | 6/2002 | Gilbert et al. | 343/780 |
| 6,407,719 B1 | 6/2002 | Ohira et al. | 343/893 |
| 6,417,807 B1 | 7/2002 | Hsu et al. | 343/700 MS |
| 6,424,319 B2 | 7/2002 | Ebling et al. | 343/911 L |
| 6,426,722 B1 | 7/2002 | Sievenpiper et al. | 343/700 MS |
| 6,440,767 B1 | 8/2002 | Loo et al. | 438/52 |
| 6,469,673 B2 | 10/2002 | Kaiponen | 343/703 |
| 6,473,362 B1 | 10/2002 | Gabbay | 367/119 |
| 6,483,480 B1 | 11/2002 | Sievenpiper et al. | 343/909 |
| 6,496,155 B1 | 12/2002 | Sievenpiper et al. | 343/770 |
| 6,515,635 B2 | 2/2003 | Chiang et al. | 343/834 |
| 6,518,931 B1 | 2/2003 | Sievenpiper | 343/700 |
| 6,525,695 B2 | 2/2003 | McKinzie, III | 343/756 |
| 6,538,621 B1 | 3/2003 | Sievenpiper et al. | 343/909 |
| 6,552,696 B1 | 4/2003 | Sievenpiper et al. | 343/909 |
| 6,624,720 B1 | 9/2003 | Allison et al. | 333/105 |
| 6,642,889 B1 | 11/2003 | McGrath | 343/700 MS |

| | | | |
|---|---|---|---|
| 6,657,525 B1 | 12/2003 | Dickens et al. | 335/78 |
| 6,741,207 B1 | 5/2004 | Allison et al. | 342/371 |
| 6,822,622 B2 | 11/2004 | Crawford et al. | 343/909 |
| 6,864,848 B2 | 3/2005 | Sievenpiper | 343/767 |
| 6,897,810 B2 | 5/2005 | Dai et al. | 343/700 MS |
| 2001/0035801 A1 | 11/2001 | Gilbert | 333/126 |
| 2002/0036586 A1 | 3/2002 | Gothard et al. | 342/374 |
| 2003/0034922 A1* | 2/2003 | Isaacs et al. | 343/702 |
| 2003/0193446 A1 | 10/2003 | Chen | 343/893 |
| 2003/0222738 A1 | 12/2003 | Brown et al. | 333/206 |
| 2003/0227351 A1 | 12/2003 | Sievenpiper | 333/105 |
| 2004/0113713 A1 | 6/2004 | Zipper et al. | 333/103 |
| 2004/0135649 A1 | 7/2004 | Sievenpiper | 333/105 |
| 2004/0227583 A1 | 11/2004 | Shaffner et al. | 333/32 |
| 2004/0227667 A1 | 11/2004 | Sievenpiper | 343/700 MS |
| 2004/0227668 A1 | 11/2004 | Sievenpiper | 343/700 MS |
| 2004/0227678 A1 | 11/2004 | Sievenpiper | 343/702 |
| 2004/0263408 A1 | 12/2004 | Sievenpiper et al. | 343/757 |
| 2005/0012667 A1 | 1/2005 | Noujeim | 343/700 MS |
| 2006/0192465 A1* | 8/2006 | Kornbluh et al. | 310/800 |

FOREIGN PATENT DOCUMENTS

| | | |
|---|---|---|
| EP | 0 539 297 | 4/1993 |
| EP | 1 158 605 A1 | 11/2001 |
| FR | 2 785 476 | 5/2000 |
| GB | 1145208 | 3/1969 |
| GB | 2 281 662 | 3/1995 |
| GB | 2 328 748 | 3/1999 |
| JP | 61-260702 | 11/1986 |
| WO | 94/00891 | 1/1994 |
| WO | 96/29621 | 9/1996 |
| WO | 98/21734 | 5/1998 |
| WO | 99/50929 | 10/1999 |
| WO | 00/44012 | 7/2000 |
| WO | 01/31737 | 5/2001 |
| WO | 01/73891 A1 | 10/2001 |
| WO | 01/73893 A1 | 10/2001 |
| WO | 03/009501 A1 | 1/2003 |
| WO | 03/098732 A1 | 11/2003 |

OTHER PUBLICATIONS

Balanis, C., "Microstrip Antennas," *Antenna Theory, Analysis and Design*, 2nd Edition, Ch. 14, pp. 722-736 (1997).

Bialkowski, M.E., et al., "Electronically Steered Antenna System for the Australian Mobilesat," *IEEE Proc.-Microw. Antennas Propag.*, vol. 143, No. 4, pp. 347-352 (Aug. 1996).

Bradley, T.W., et al al., "Development Of A Voltage-Variable Dielectric (VVD), Electronic Scan Antenna," *Radar 97*, Publication No. 449, pp. 383-385 (Oct. 1997).

Brown, W.C., "The History of Power Transmission by Radio Waves," *IEEE Transactions on Microwave Theory and Techniques*, vol. MTT-32, No. 9, pp. 1230-1242 (Sep. 1984).

Bushbeck, M.D., et al., "A tunable switcher dielectric grating", IEEE Microwave and Guided Wave letters, vol. 3, No. 9, pp. 296-298 (Sep. 1993).

Chambers, B., et al., "Tunable Radar Absorbers Using Frequency Selective Surfaces", 11th International Conference on Antennas and Propagation, vol. 50, pp. 832-835 (2002).

Chang, T.K., et al., "Frequency Selective Surfaces on Biased Ferrite Substrates", Electronics Letters, vol. 3o, No. 15, pp. 1193-1194 (Jul. 21, 1994).

Chen, P.W., et al., "Planar Double-Layer Leaky-Wave Microstrip Antenna," *IEEE Transactions on Antennas and Propagation*, vol. 50, pp. 832-835 (2002).

Gianvittorio, J.P., et al., "Reconfigurable MEMS-enabled Frequency Selective surfaces", Electronic Letters, vol. 38, No. 25, pp. 16527-1628 (Dec. 5, 2002).

Chen, Q., et al., "FDTD diakoptic design of a slot-loop antenna excited by a coplanar waveguide," *Proceedings of the 25th European Microwave Conference 1995*, vol. 2, Conf. 25, pp. 815-819 (Sep. 4, 1995).

Cognard, J., "Alignment of Nematic Liquid Crystals and Their Mixtures," *Mol. Cryst. Liq., Cryst. Suppl. 1*, pp. 1-74 (1982).

Doane, J.W., et al., "Field Controlled Light Scattering from Nematic Microdroplets," *Appl. Phys. Lett.*, vol. 48, pp. 269-271 (Jan. 1986).

Ellis, T.J. et al., "MM-Wave Tapered Slot Antennas on Micromachined Photonic Bandgap Dielectrics," *1996 IEEE MTT-S International Microwave Symposium Digest*, vol. 2, pp. 1157-1160 (1996).

Fay, P., "High-Performance Antimonide-Based Heterostructure Backward Diodes for Millimeter-Wave Detection," *IEEE Electron Device Letters*, vol. 23, No. 10, pp. 585-587 (Oct. 2002).

Gold, S.H., et al., "Review of High-Power Microwave Source Research," *Rev. Sci. Instrum.*, vol. 68, No. 11, pp. 3945-3974 (Nov. 1997).

Grbic, A., et al., "Experimental Verification of Backward-Wave Radiation From A Negative Refractive Index Metamaterial," *Journal of Applied Physics*, vol. 92, No. 10, pp. 5930-5935 (Nov. 15, 2002).

Hu, C.N., et al., "Analysis and Design of Large Leaky-Mode Array Employing The Coupled-Mode Approach," *IEEE Transactions on Microwave Theory and Techniques*, vol. 49, No. 4, pp. 629-636 (Apr. 2001).

Jablonski, W., et al., "Microwave Schottky Diode With Beam-Lead Contacts," *13th Conference on Microwaves, Radar and Wireless Communications*, MIKON-2000, vol. 2, pp. 678-681 (2000).

Jensen, M.A., et al., "EM Interaction of Handset Antennas and a Human in Personal Communications," *Proceedings of the IEEE*, vol. 83, No. 1, pp. 7-17 (Jan. 1995).

Jensen, M.A., et al., "Performance Analysis of Antennas for Hand-Held Transceivers Using FDTD," *IEEE Transactions on Antennas and Propagation*, vol. 42, No. 8, pp. 1106-1113 (Aug. 1994).

Koert, P., et al., "Millimeter Wave Technology for Space Power Beaming," *IEEE Transactions on Microwave Theory and Techniques*, vol. 40, No. 6, pp. 1251-1258 (Jun. 1992).

Lee, J.W., et al., "TM-Wave Reduction from Grooves In A Dielectric-Covered Ground Plane," IEEE Transactions on Antennas and Propagation, Vol. 49, No. 1, pp. 104-105 (Jan. 2001).

Lezec, H.J., et al., "Beaming Light from a Subwavelength Aperture," *Science*, vol. 297, pp. 820-821 (Aug. 2, 2002).

Lima, A.C., et al., "Tunable Freuency Selective Surfaces Using Liquid Substrates", Electronic Letters, vol. 30, No. 4, pp. 281-282 (Feb. 17, 1994).

Linardou, I., et al., "Twin Vivaldi Antenna Fed By Coplanar Waveguide," *Electronics Letters*, vol. 33, No. 22, pp. 1835-1837 (1997).

Malherbe, A., et al., "The Compenasation of Step Discontinues in TEM-Mode Transmission Lines," *IEEE Transactions on Microwave Theory and Techniques*, vol. MTT-26, No. 11, pp. 883-885 (Nov. 1978).

Maruhashi, K., et al., "Design and Performance of a Ka-Band Monolithic Phase Shifter Utilizing Nonresonant FET Switches," *IEEE Transactions on Microwave Theory and Techniques*, vol. 48, No. 8, pp. 1313-1317 (Aug. 2000).

McSpadden, J.O., et al., "Design and Experiments of a High-Conversion-Efficiency 5.8-GHz Rectenna," *IEEE Transactions on Microwave Theory and Techniques*, vol. 46, No. 12, pp. 2053-2060 (Dec. 1998).

Oak, A.C., et al., "A Varactor Tuned 16 Element MESFET grid Oscillator", Antennas an Propagation Society International Symposium, pp. 1296-1299 (1995).

Perini, P., et al., "Angle and Space Diversity Comparisons in Different Mobile Radio Environments," *IEEE Transactions on Antennas and Propagation*, vol. 46, No. 6, pp. 764-775 (Jun. 1998).

Ramo, S., et al., *Fields and Waves in Communication Electronics*, 3rd Edition, Sections 9.8-9.11, pp. 476-487 (1994).

Rebeiz, G.M., et al., "RF MEMS Switches and Switch Circuits," *IEEE Microwave Magazine*, pp. 59-71 (Dec. 2001).

Schaffner, J., et al., "Reconfigurable Aperture Antennas Using RF MEMS Switches for Multi-Octave Tunability and Beam Steering," *IEEE Antennas and Propagation Society Interantional Symposium, 2000 Digest*, vol. 1 of 4, pp. 321-324 (Jul. 16, 2000).

Schulman, J.N., et al., "Sb-Heterostructure Interband Backward Diodes," *IEEE Electron Device Letters*, vol. 21, No. 7, pp. 353-355 (Jul. 2000).

Semouchkina, E., et al., "Numerical Modeling and Experimental Study of A Novel Leaky Wave Antenna," *Antennas and Propagation Society*, IEEE International Symposium, vol. 4, pp. 234-237 (2001).

Sievenpiper, D., et al., "Beam Steering Microwave Reflector Based On Electrically Tunable Impedance Surface," *Electronics Letters*, vol. 38, No. 21, pp. 1237-1238 (Oct. 1, 2002).

Sievenpiper, D., et al., "Eliminating Surface Currents With Metallodielectric Photonic Crystals," *1998 MTT-S International Microwave Symposium Digest*, vol. 2, pp. 663-666 (Jun. 7, 1998).

Sievenpiper, D., et al., "High-Impedance Electromagnetic Surfaces with a Forbidden Frequency Band," *IEEE Transactions, on Microwave Theory and Techniques*, vol. 47, No. 11, pp. 2059-2074 (Nov. 1999).

Sievenpiper, D., et al., "High-Impedance Electromagnetic Surfaces," *Ph.D. Dissertation*, Dept. Of Electrical Engineering, University of California, Los Angeles, CA, pp. i-xi, 1-150 (1999).

Sievenpiper, D., et al., "Low-Profile, Four-Sector Diversity Antenna On High-Impedance Ground Plane," *Electronics Letters*, vol. 36, No. 16, pp. 1343-1345 (Aug. 3, 2000).

Sieveniper, D.F., et al., "Two-Dimensional Beam Steering Using an Electrically Tunable Impedance Surface," *IEEE Transactions on Antennas and Propagation*, vol. 51, No. 10, pp. 2713-2722 (Oct. 2003).

Sor, J., et al., "A Reconfigurable Leaky-Wave/Patch Microstrip Aperture For Phased-Array Applications," *IEEE Transactions on Microwave Theory and Techniques*, vol. 50, No. 8, pp. 1877-1884 (Aug. 2002).

Strasser, B., et al., "5.8-GHz Circularly Polarized Rectifying Antenna for Wireless Microwave Power Transmission," *IEEE Transactions on Microwave Theory and Techniques*, vol. 50, No. 8, pp. 1870-1876 (Aug. 2002).

Swartz, N., "Ready for CDMA 2000 1xEV-Do?," *Wireless Review*, 2 pages total (Oct. 29, 2001).

Vaughan, Mark J., et al., "InP-Based 28 $Gh_2$ Integrated Antennas for Point-to-Multipoint Distribution," *Proceedings of the IEEE/Cornell Conference on Advanced Concepts in High Speed Semiconductor Devices and Circuits*, pp. 75-84 (1995).

Vaughan, R., "Spaced Directive Antennas for Mobile Communications by the Fourier Transform Method," *IEEE Transactions on Antennas and Propagation*, vol. 48, No. 7, pp. 1025-1032 (Jul. 2000).

Wang, C.J., et al., "Two-Dimensional Scanning Leaky-Wave Antenna by Utilizing the Phased Array," *IEEE Microwave and Wireless Components Letters*, vol. 12, No. 8, pp. 311-313, (Aug. 2002).

Wu, S.T., et al., "High Birefringence and Wide Nematic Range Bis-Tolane Liquid Crystals," *Appl. Phys. Lett.*, vol. 74, No. 5, pp. 344-346 (Jan. 18, 1999).

Yang, F.R., et al., "A Uniplanar Compact Photonic-Bandgap (UC-PBG) Structure and Its Applications for Microwave Circuits," *IEEE Transactions on Microwave Theory and Techniques*, vol. 47, No. 8, pp. 1509-1514 (Aug. 1999).

Yang, Hung-Yu David, et al., "Theory of Line-Source Radiation From A Metal-Strip Grating Dielectric-Slab Structure," *IEEE Transactions on Antennas and Propagation*, vol. 48, No. 4, pp. 556-564 (2000).

Yashchyshyn, Y., et al., The Leaky-Wave Antenna With Ferroelectric Substrate, *14th International Conference on Microwaves, Radar and Wireless Communications*, MIKON-2002, vol. 2, pp. 218-221 (2002).

\* cited by examiner

LARGE-SCALE ADAPTIVE SURFACE SENSOR ARRAYS

CROSS REFERENCE TO A RELATED APPLICATION

This application is related to U.S. patent application Ser. No. 10/944,032 filed 17 Sep. 2004 entitled "Large Aperture Rectenna Based on Planar Lens Structures", which application is assigned to the assignee of the present application. The disclosure of U.S. patent application Ser. No. 10/944,032 is hereby incorporated herein by reference.

TECHNICAL FIELD

This disclosure relates to large-scale actuator arrays and sensors for the contour and control of surfaces for outer space and other applications.

BACKGROUND

The implementation of a system of large-scale actuator arrays and sensors for the contour and control of surfaces for space or other applications, presents significant challenges. Among these challenges are the following:

Structure size and mass density—For mobile or spaceborne applications, control surfaces should be weight efficient and capable of repeatable deployment (and possibly re-stowage) from a small volume. For reflector antenna applications, extremely large apertures offer unique performance characteristics. These expansive, gossamer structures will most likely require actively-controlled actuator arrays to stabilize the surface. The power and control network must be similarly mass efficient and not interfere with the deployment or stability of the structure.

Power transfer efficiency and isolation—An array of actuators and sensors distributed over a very large surface should be powered and controlled efficiently with minimal interference with the system's mission, nearby systems and subsystems collocated on the associated platform.

Surface precision and actuator density—As a structure decreases in stiffness which is typical of large deployable systems with low mass density, the more significant the higher structural modes become. For antenna reflector and optical surfaces, the higher the mission frequency the more precise the surface must be maintained. In either case, increasing the number and/or complexity of the actuators on the surface will likely be required. The higher number and greater functionality of the actuator array, complicates the corresponding power and control network.

The present invention, which preferably takes advantage of rectennae, may be deployed as a power and control network for a large active structure, thereby addressing each of the above issues by employing highly localized RF surface waves propagating across a meta-surface to transmit signals for power and command. Using these surface waves, in effect, creates a 2-D wireless network that is well-suited for active surfaces. This approach has much of the configuration flexibility of a standard broadcast-type wireless system but with significantly greater power efficiency and signal isolation.

The present invention permits, but does not require communication and power transfer between a central control module and an array of distributed actuators; being especially useful when the actuators are distributed over a large-scale adaptive surface. It provides a way of increasing the signal power in the region where the sensors are located, and minimizing the amount of radiation that is lost to free space.

Surface wave Power is collected at an actuator with a surface wave rectenna. A rectenna is a known device:
  (i) a rectenna (RECTifying antENNA), is a special type of antenna that is used to directly convert microwave energy into DC electricity. Its elements are usually arranged in a mesh pattern, giving it a distinct appearance from most antennae.
  (ii) a simple rectenna can be constructed from a Schottky diode placed between antenna dipoles. The diode rectifies the current induced in the antenna by the microwaves. Schottky diodes are used because they have the lowest voltage drop and therefore waste the minimum power.
  (iii) rectennae are highly efficient at converting microwave energy to electricity. In laboratory environments, efficiencies above 90% have been observed with regularity.

See U.S. patent application Ser. No. 10/944,032 filed 17 Sep. 2004 for information about rectenna designs using a Frequency Selective Surface (FSS).

Its advantages over other systems and methods are:
  that it can be an integral part of the active surface, thus minimizing complexity.
  the surface waves used to transfer power and data throughout the surface are tightly bound to the surface without field leakage into surrounding space, unlike wireless methods where a large portion of the signal radiates into space, thereby wasting power, and reducing efficiency. This is especially critical when power is being transmitted wirelessly.
  that it does not require high-precision pointing and tracking hardware such as are necessary with optical methods that are often proposed for wirelessly transmitting power via highly directive lasers.
  that it does not require a network of wires running over the surface such as is used in methods where direct connections are made between the control point and the actuators.
  that the meta-surface is potentially mass produced and therefore inexpensive.
  it provides robustness against single-point breaks, which would be a problem for a network of wires, so it is robust against localized damage.
  the single conductor, surface wave method for distributing power provides protection against shorts, which would otherwise be a problem for a parallel system like this.

The invention can be applied to actuator arrays on large-scale adaptive antennas used to provide reconfigurable beam-gain profiles for satellite broadcasts, for example. Large scale antennas can be 1 meter and up in size. A flexible reflector with actuators that can deform the reflecting surface in response to the beam quality, based on the reported signal quality at various locations on Earth, should prove to be quite useful. Another potential application is with mobile ground-based RF antennas and optical structures that must packaged and transported within a small volume on a space vehicle, then deployed and controlled when in operation in space.

Another application is the control and monitoring of an array of passive sensors that, for example, monitor temperature, pressure, material strain or any other physical parameter.

Additionally, the disclosed surface-wave medium can be integrated within structural components (walls, etc.) to create a multifunctional structure that provides communication and power of distributed sensors and actuators.

The surface waves enable addressing an array of sensors without the complexity, cost and low reliability of wiring harnesses and power and data busses. The sensors can be embedded within the structure or retrofitted to it after fabrication and reconfigured as necessary. This multifunctional structure allows advanced control and monitoring functions without the detriments of the attendant complexity, weight and failure modes of wired networking and power.

The surface-wave control, communication and power functionality advantageously provides the benefits of (1) integrating the power and control into a single 'bus', (2) implicit built-in redundancy and tolerance to damage, (3) safety-critical capability where the sensors are placed in harsh environments not amenable to conventional wiring harnesses thus improving reliability and increasing structural and system health monitoring functionality, (4) reducing vehicle weight and complexity by reducing the number of wiring harnesses by 10 to 15%, (5) facilitating common sensor deployment that leads to reduced maintenance cost and improved dispatch reliability of several percentage points, and (6) simplifying the design of vehicle power and electrical distribution systems.

These attributes would uniquely enable multi-node sensing systems such as those required for the integrated health management of existing and new space and air vehicles.

One important feature of this invention is to simultaneously provide power and control signals to a network of sensors and/or actuators distributed over a large surface, as in a large aperture reflector. This can be accomplished without the use of power and control wires which complicate the architecture, add mass, and may interfere with the deployment and function of the structure (if they bind or tangle).

Other wireless systems have been proposed, including:
1) A free-space RF broadcast system capable of providing both control signals and power when rectified. However, this technical can be inefficient if the transmit beam angle is large and the broadcast frequency is high. In this case, the power available to the actuator is very low due to the small size of the receive antenna compared to the beam footprint at the surface. Much of the transmitted power is therefore lost. Another potential problem is that the radiated energy may interfere with sensitive systems on or near the platform or inadvertently reflected off the surface and interfere with the platform's mission. Chadwick and Hughes (WO 03/009501) propose a more efficient wireless system within an evanescent field defined by an enclosed space. In many cases though, the surface does not form an enclosed space, and much of the benefit is lost.
2) An optical system wherein power and commands transmitted by a laser and received by a photovoltaic device at each actuator. Miller (U.S. Pat. No. 5,709, 245), Hagans et al (U.S. Pat. No. 6,055,079) and others show methods and devices for transmitting power and simplified command information optically to a photovoltaic device. On one hand, if the beam is focused sufficiently to provide enough power for reasonable operation of the device, the collimated beam may have to be mechanically steered and possibly capable of acquiring and tracking photoreceptors at multiple locations over a large surface. This process often requires complex and precise gimballing mechanisms and tracking systems. On the other hand, if the beam is defocused to cover the range of motion for a significantly large surface, the output power of the laser must be increased to provide a comparable power density at the photovoltaic device.
3) Using an electron gun to remotely charge piezoelectric flexural actuators located on the control surface. See Martin et al. (U.S. Pat. No. 6,297,579). The electron beam can be directed without using gimbals, and control and power electronics at each actuator are not required. However, actuator options with this method are limited and possibly prohibitive. Also, as with all focused beam concepts, more complex acquisition and tracking may be required as structural range-of-motion and/or actuator density increases.

BRIEF DESCRIPTION OF THE PRESENT INVENTION

The present invention preferably provides an adaptive surface comprising:
a dielectric surface having a repeating pattern of electrically conductive structures disposed thereon, the dielectric surface in combination with repeating pattern of electrically conductive structures forming a metasurface for binding surface waves thereto;
a plurality of actuators on the dielectric surface for altering the shape of the metasurface in response to control signals;
a plurality of sensors on the dielectric surface for measuring a desired parameter and converting it to data;
a plurality of rectennas disposed on the dielectric surface for providing electrical power to said actuators and to said sensors; and
a plurality of data antennas disposed on the dielectric surface, the data antennas being coupled with data receivers and data transmitters for receiving data from an external source for controlling the actuators and for transmitting data from said sensors to an external receiver.

DETAILED DESCRIPTION

The term "metasurface" as used herein is intended to refer to a surface whose electro-magnetic properties are determined by its structure and/or geometry rather than by its constituent material properties. A frequency selective surface (FSS) is one type of a metasurface.

In one embodiment, the present invention includes a meta-surface (a specially designed textured surface 9—see, for example, FIG. 2a) that supports localized electromagnetic surface wave tightly bound to its surface, one or more surface-wave transmitters and an array of surface wave receivers. In one application, the transmitter is used in conjunction with a central control module that modulates surface-wave carriers with a power transmission signal and data signals. A single transmitter or a plurality of separate transmitters can be used to transmit the power and data waves. Meanwhile the receivers are connected to an array of actuators, sensors, or a network of other devices, that are powered preferably with the surface-wave power signal and are controlled with the data signals. The surface waves would preferably illuminate all of the receivers, but they could be arranged, through proper excitation of the sources, to illuminate only a subset of the receivers. These receivers would then collect energy from this surface wave and use that energy to perform a task, such as mechanically deforming the surface of an antenna. The surface wave signal could also be encoded to simplify the addressing scheme, and to tell the sensors which way to move.

Figure 1:
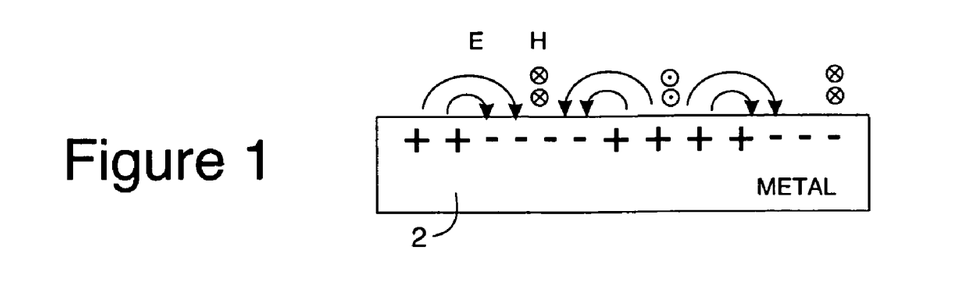
FIG. 1 is a schematic view of a TM surface wave on a flat metal surface. At optical frequencies these are known as surface plasmons, but they also occur at microwave frequencies. The properties of the surface wave can be controlled by texturing the surface.

Surface waves are well known in optics, where they are called surface plasmons. They are simply waves that are bound to the interface between two materials. An example of a transverse magnetic (TM) surface wave is shown in FIG. 1, and it is characterized by longitudinally oscillating charges (shown by the plus and minus signs) on a metal surface, along with the associated fields in free space (shown by the arrows, both the curved ones in the plane of the drawing and those coming into and out of the plane of the drawing). Plasmons also exist at microwave frequencies. However, on a flat metal surface 2, they typically extend many thousands of wavelengths into the surrounding space, and are not very useful for wave guiding. Traditional techniques for guiding surface waves generally involve thick dielectric coatings, which would clearly not be suitable for space applications. However, it is possible to produce thin, light-weight structures that can have strong surface wave guiding effects.

Figure 2A:
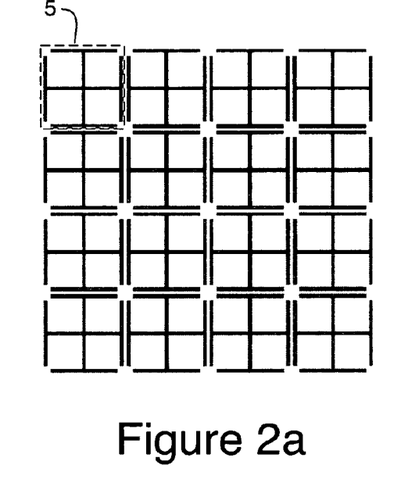
FIGS. 2a and 2b depict a Jerusalem cross metasurface, an exemplary textured surface that can be used for surface wave guiding.
Figure 2B:
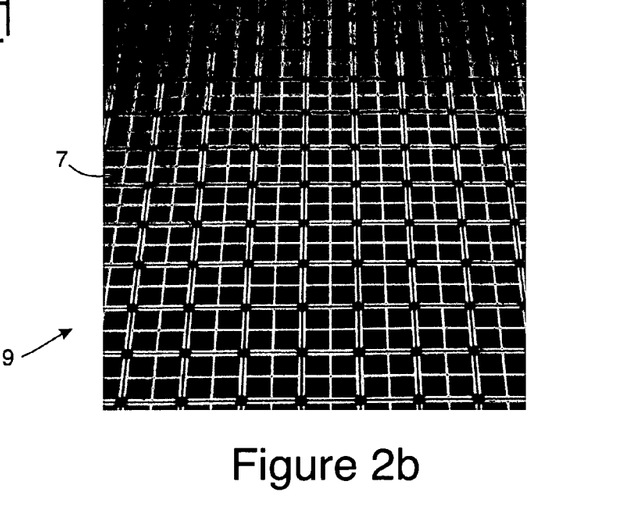
Figure 2C:
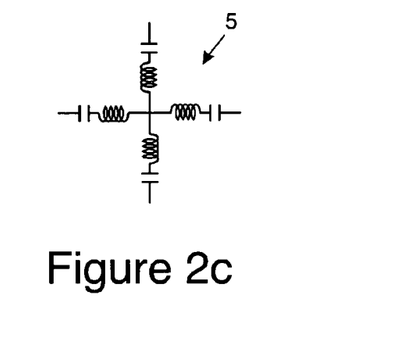
FIG. 2c shows an equivalence schematic diagram of an element of the Jerusalem cross.

One example of such a surface-wave supporting texture, known as a Jerusalem cross metasurface 9, is shown in plan view by FIG. 2a. Several Jerusalem crosses 5 are shown in FIG. 2a. FIG. 2b shows a plurality of Jerusalem crosses 5 fabricated on a dielectric surface 7. The dielectric surface 7 may be very thin and light weight. For example, 0.01 inch thick kapton would make a good and very flexible dielectric surface 7. The Jerusalem crosses 5 may be fabricated on the kapton by printing the metallic forms of the Jerusalem crosses thereon to form a metasurface 9. FIG. 2c depicts a circuit equivalent of a single Jerusalem cross unit 5.

This is only one example of a metasurface 9, and those skilled in the art will appreciate it that there are many similar structures that have similar properties, including various types of high impedance surfaces that, generally speaking, require more complex elements than the Jerusalem cross units 5 depicted here.

The concept of using texturing (metallic or conductive repeating patterns—such as the Jerusalem crosses 5 discussed above—on a dielectric surface 7 to form a metasurface 9) for surface wave guiding is to alter the surface impedance to change the decay constant of the wave into free space. On a uniform flat metal, surface wave modes extend many thousands of wavelengths into space. For this reason, they are more often referred to as surface currents at microwave frequencies, because the wave is so loosely bound to the metal. However, for a general surface characterized by its complex surface impedance (due to the repeating metal/conductive patterns such as the aforementioned Jerusalem crosses 5), the decay constant into free space can be quite rapid, particularly when the surface impedance is highly inductive. By building resonant structures (such as the Jerusalem crosses 5 discussed above) into the surface 9, it can be designed so that surface waves are bound to within a wavelength of the surface 9 and it can be useful for wave guiding.

Figure 3A:
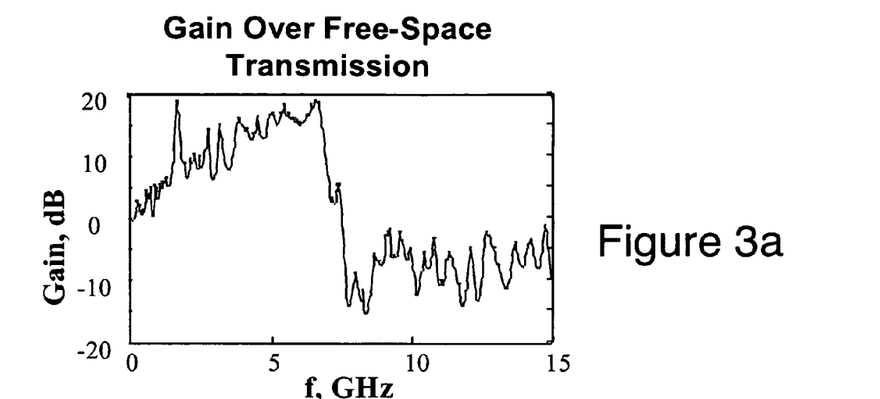
FIG. 3a is a graph of surface wave transmission between two probes in the case of the metasurface 9 of FIGS. 2a and 2b.

For the metasurface 9 of FIGS. 2a and 2b, a graph of surface wave transmission between two probes is shown in FIG. 3a. The increasing transmission magnitude up to about 7 GHz is an indication that the wave is tightly bound to the surface at that frequency. The bandwidth of the high-transmission region is nearly 2 GHz wide, allowing for high data rate transmissions or multiple frequency allocations for different communications channels, if necessary. The frequency of propagation of the surface wave is a function of the metasurface geometry and scaling. The metasurface 9 can be made to operate at any frequency desired.

Figure 3B:
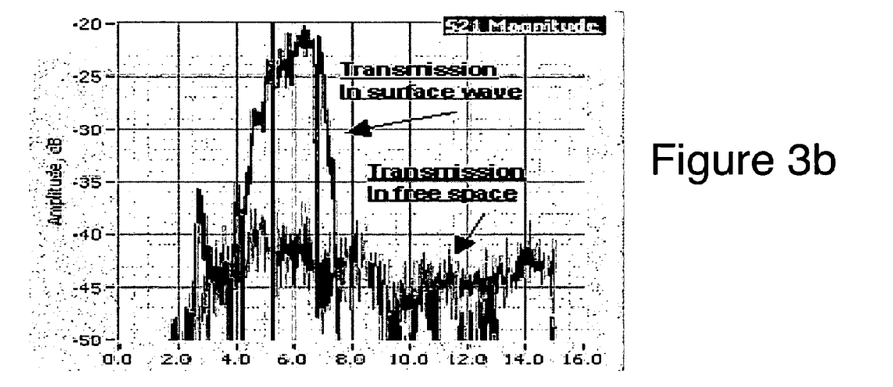
FIG. 3b is a graph showing the test results of two probes being placed near the surface of the metasurface of FIG. 2a showing a tightly bound surface wave is detected by the high transmission magnitude (s21) between the probes near seven gigahertz, while a second graph shows the intensity of the transmission between the probes through free space.

FIG. 3b shows how the surface wave transmission is enhanced by 20 db over free-space transmission. This test was performed by positioning two probes near the metasurface and measuring the transmission vs. frequency. The probes were spaced 25 cm apart.

Power that is coupled into the surface can be efficiently collected using rectenna technology. Sensing can be accomplished by a series of sensors 12 (see FIG. 4) distributed across the surface. The power transmitted across the surface is used to operate the sensors 12. The sensors 12 are typically not there to sense the power, rather they are preferably there to sense something else, like some environmental condition (temperature, pressure, radiation, etc.), structural strain and stress, or anything of interest to an user. The sensors 12 then can relay information about the measurements sensed across the metasurface to a central control unit. The information transfer and the power transfer coexists on the surface, but they are there for different purposes in a sensing array.

Figure 1A:
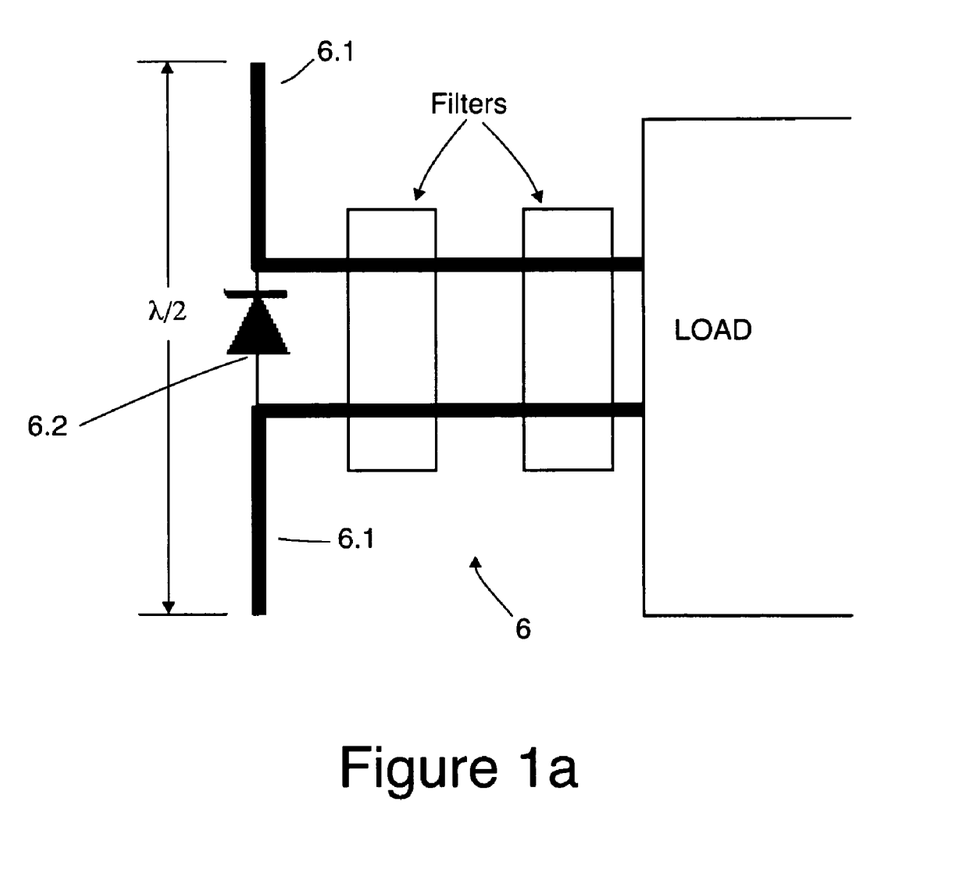
FIG. 1a depicts a conventional rectenna.

Power collection on surface 9 preferably occurs using, for example, a large number of rectennae 6. FIG. 1a depicts a single, conventional rectenna 6. The rectenna has an antenna 6.1 and a rectifying diode 6.2. Many rectennae 6 would be disposed on metasurface 9 in order to collect sufficient power. The power collected can then be used, for example, to supply power to the sensors 12.

The size of a single rectenna 6 (see FIG. 1*a*) is constrained by the wavelength of the transmitted RF power. Since the power collected is proportional to the rectenna size times the power density of the transmitted power wave, then the total power collected is also limited by the wavelength. To increase the collected power, several rectennae can be coupled together to increase the power collection. It is believed that rectennae can be coupled together in a phased array arrangement to collect power over a large area. Just like the amount of solar power collected by solar panels is proportional to how much area the solar panels cover, the amount of RF power that can be collected per transponder is dictated by how much of the RF wave is intercepted.

Figure 1B:
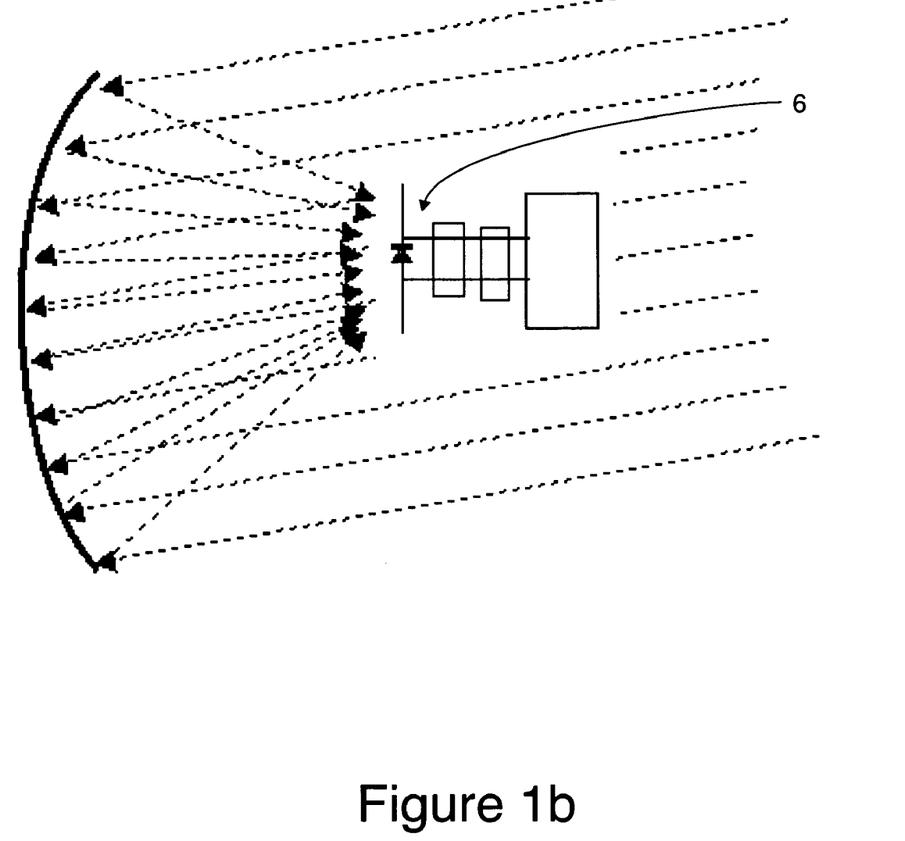
FIG. 1b schematically depicts a type of parabolic RF reflector that may be built into a surface for collecting RF energy and for focusing it onto a single rectenna.

It is also envisioned that a type of parabolic RF reflector may be built into the surface that collects the RF energy and focus it onto a single rectenna (see FIG. 1*b*). This is analogous to how satellite dishes work. They have a parabolic reflector that focuses the RF from the satellite to a small transceiver at the dish's focal point. In the embodiment of FIG. 1*b* the received RF energy is focused on one or more rectennae.

Alternatively, the power transmitter can radiate isotropically into the surface with the rectennae. But it's also possible to use reflectors and/or arrays to direct the power in specific directions.

The rectenna can be fabricated separately on a piece of insulating film which is then applied to metasurface 9 using, for example, adhesives or other bonding techniques.

Figure 4:
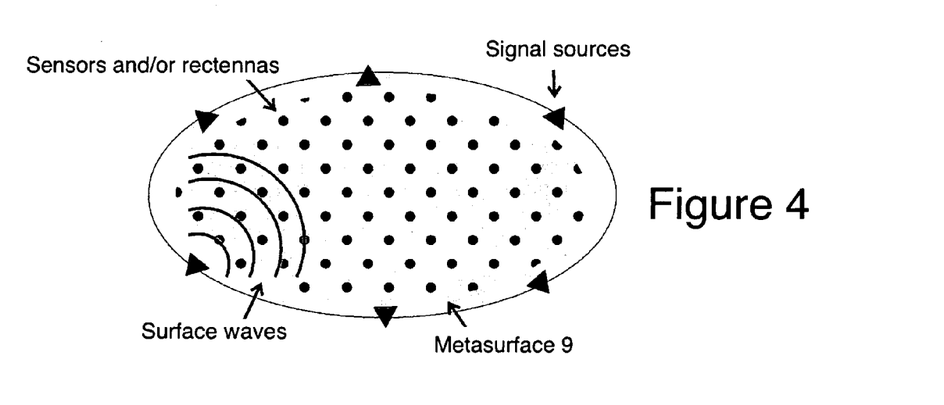
FIG. 4 depicts a large, flexible reflector antenna which may be adjusted with an array of actuators.

The operating frequency of the metasurface 9 can be tuned by changing the design of the repeating conductive patterns or textures (such as the Jerusalem crosses 5) on the dielectric surface 7. This concept can be applied to large reflector antennas, by locating several signal sources at the edges of the reflector, and arraying receivers across the surface of the reflector, as shown in FIG. 4. The reflector can be covered with the surface-wave supporting material (e.g., the meta-surface), which would facilitate the transmission of tightly bound surface waves, so that the sources could efficiently couple energy and information to the sensors. The sensors 12 can be addressed individually by assigning each one a code. The signal(s) sent by the source(s) 10 can then be modulated by the code of the sensor 12 that it was trying to address, and only the intended 12 sensor would respond. In this way, any individual actuator associated with a sensor could be accurately controlled. Several actuators could be moved simultaneously by combining multiple codes.

Indeed, the metasurface 9 can be designed to have multiple pass bands. In that way one pass band can be used for power connection using the rectennae 6 and the other pass band(s) can be used for data collection and/or for control purposes.

Figure 5:
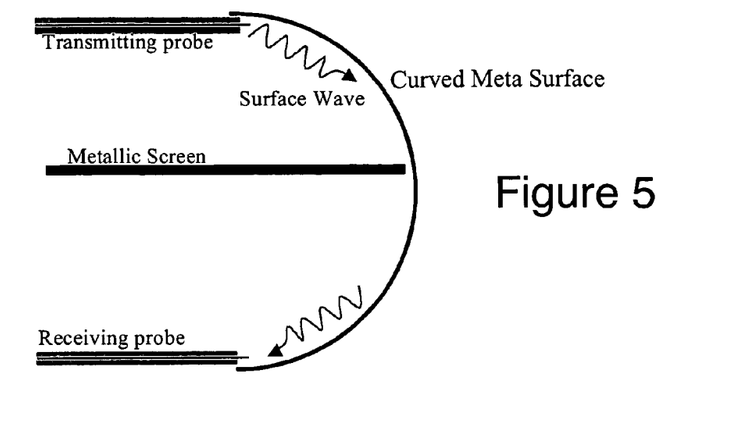
FIG. 5 depicts surface wave transmission on a curved metasurface.

Laboratory tests have been conducted to demonstrate the feasibility of transmitting and receiving surface waves across a metasurface. FIG. 3*b*, previously discussed, graphically shows how the surface wave transmission is enhanced by 20 db over free-space transmission. As indicated above, this test was performed by positioning two probes near the metasurface and measuring the transmission vs. frequency. The probes were spaced 25 cm apart. It is anticipated that the advantage over free space transmission will be greater as the probes move farther apart because the fields scale with 1/r on the surface versus $1/r^2$ in free space. Additional tests were performed to demonstrate that the surface waves propagates as well on a curved metasurface 9 as on the flat one depicted in FIG. 2*a*. In this test, the flexible metasurface (printed on kapton) was curved into a 30 cm radius (See FIG. 5) and the probe transmission measurement was repeated. A metal sheet 15 was inserted between the probes to prevent any line-of-sight transmission between the probes in free space. The test demonstrated conclusively that the surface wave is supported on a curved metasurface, and that reliable communication and power transmission could be maintained on a surface as it is flexed through various geometries.

Figure 6:
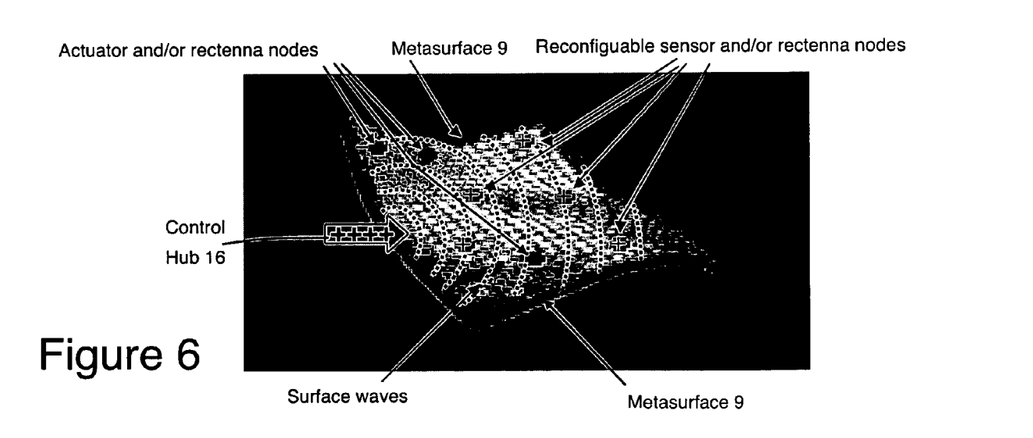
FIG. 6 is a functional schematic of an embodiment of the disclosed surface-wave power and control material.

FIG. 6 is a functional schematic of an embodiment of the disclosed surface-wave power and control material (a textured dielectric material or metasurface) 9 with a control hub 14 and sensor nodes 12 and actuators to aid in deployment and reconfiguration of the material in situ (in outer space, for example). Rectennae are preferably integrated with the sensor nodes 12 and/or with the actuators 14. The robust nature of the surface-wave medium (the textured dielectric) allows deployment in harsh environments such as outer space.

Figure 7A:
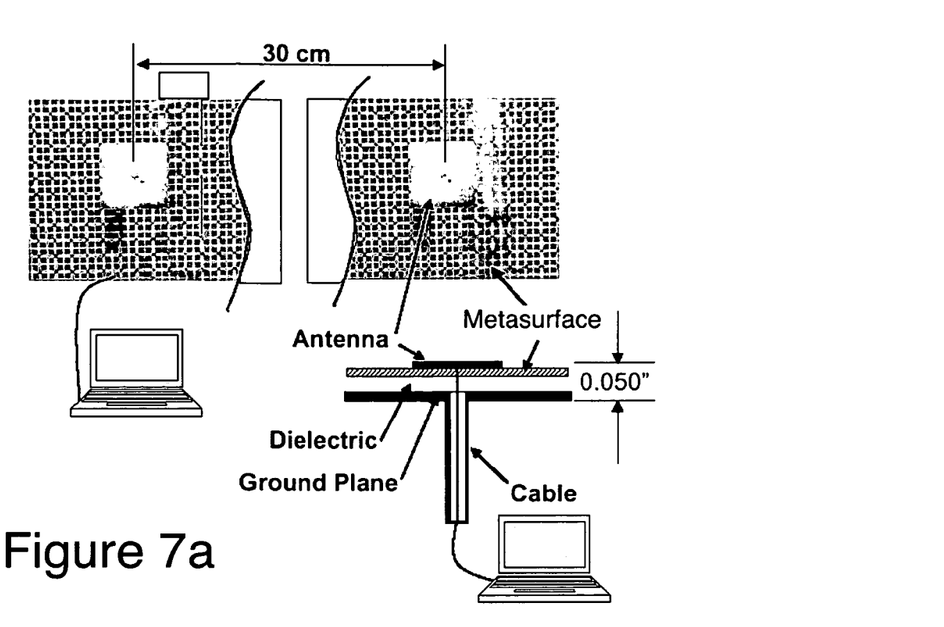
FIG. 7a is a schematic diagram of test done at HRL Laboratories, Inc to show the ability to transmit data across a metasurface.

HRL Laboratories, Inc. of Malibu, Calif. has tested surface-wave data transmission across a meta-surface. Two PCs with 802.11a wireless network cards were retrofitted to connect surface-wave antennas mounted on a meta-surface laminated onto a 0.050" thick circuit board. See FIG. 7*a*.

Figure 7B:
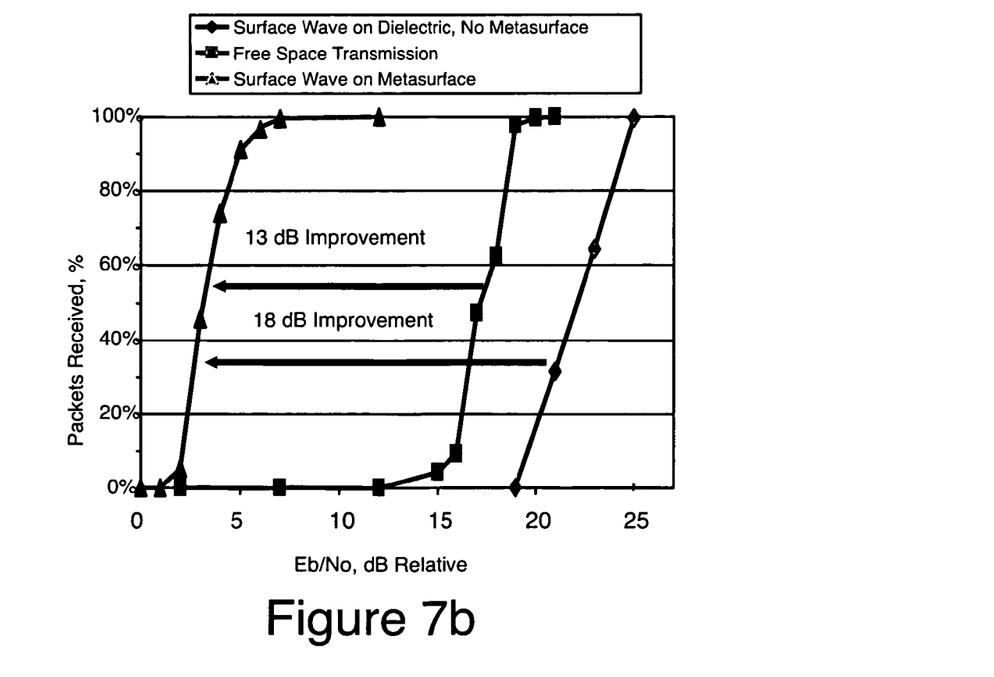
FIG. 7b is a graph representing the results of the test.

Specialized network analysis software was used to send 24-Mbps data across the surface wave and measure the transmission quality versus the signal to noise ratio. As can be seen from FIG. 7*b*, a 13-dB improvement is measured over free-space transmission and an 1 8-dB improvement over a surface wave on the circuit board dielectric with the meta-surface removed.

Figure 8:
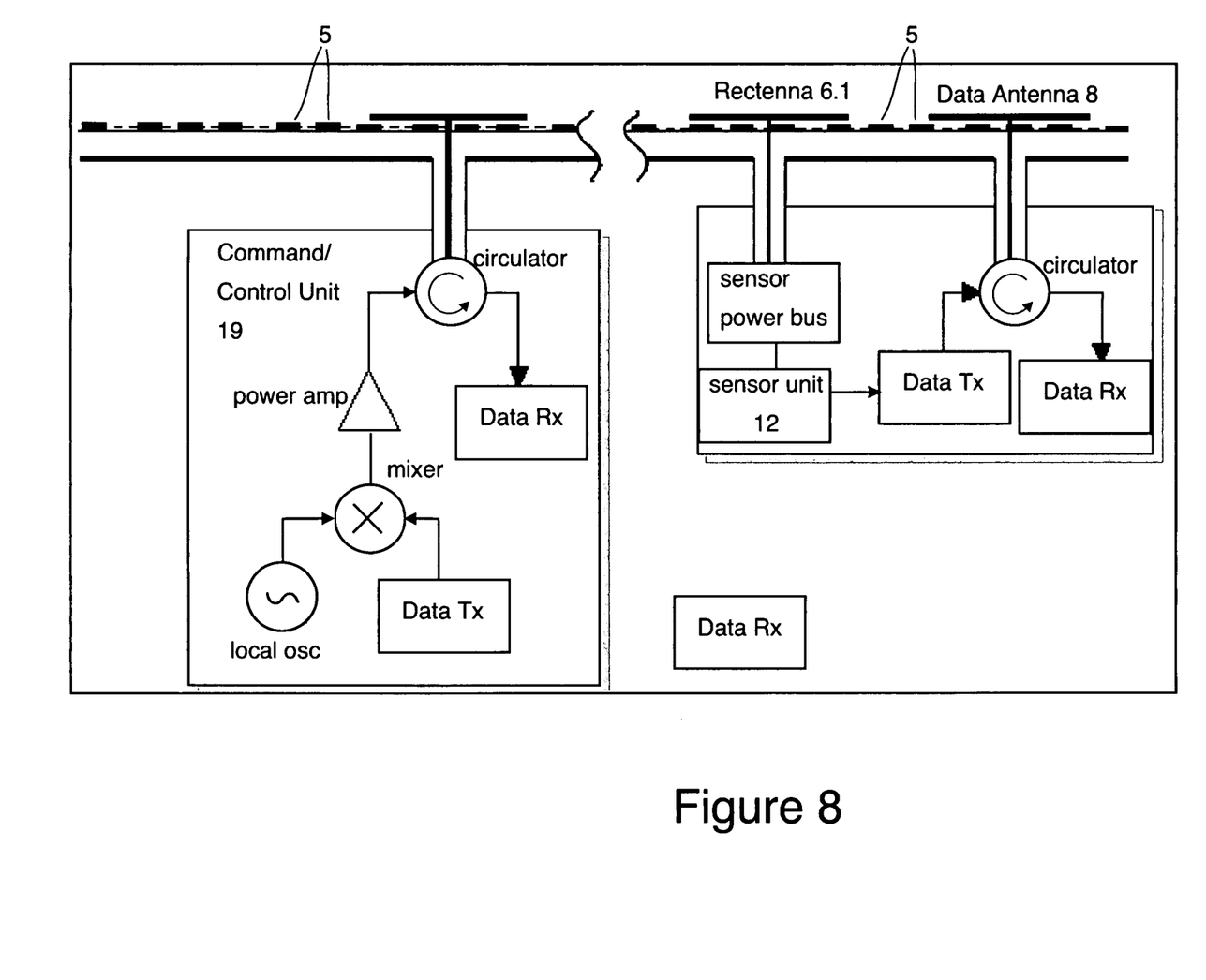
FIG. 8 is a schematic diagram of a view through the embodiment of FIG. 6.

FIG. 8 is a schematic diagram showing one antenna 6.1 of a rectenna 6 disposed on the metasurface 9. Of course, there would be many more rectennae and hence many more antennas 6. 1, each associated with a rectenna 6, disposed on the metasurface 9. The antennas 6.1 (and perhaps the diodes 6.2) are disposed on the textured side of the metasurface 9 while the associated electronics (including sensors, etc) are mounted on the opposite side of metasurface 9.

The command and control unit 19 supplies power, via surface waves, to the rectennae 6.

Having described this technology in connection with certain embodiments thereof, modification will now doubtlessly suggest itself to those skilled in the art. As such, the protection afforded hereby is not to be limited to the disclosed embodiments except as is specifically required by the appended claims.

What is claimed is:

1. An adaptive surface comprising:
   a meta surface capable of propagating surface waves;
   a plurality of actuators on or within the meta surface for altering the shape of the metasurface in response to control signals;
   a plurality of sensors on or within the meta surface for measuring a desired parameter and converting it to data;
   a plurality of rectennae disposed on or within the meta surface for providing electrical power to said actuators and to said sensors; and
   a plurality of data antennas disposed on or within the meta surface, the data antennas being coupled with data receivers and data transmitters for receiving data from an external source for controlling the actuators and for transmitting data from said sensors to an external receiver.

2. The adaptive surface of claim 1 wherein the metasurface is a flexible dielectric surface having a repeating pattern of electrically conductive structures disposed thereon or therein, the dielectric surface in combination with repeating pattern of electrically conductive structures forming a metasurface for binding surface waves thereto.

3. The adaptive surface of claim 2 wherein the dielectric surface is a flexible dielectric sheet having a thickness equal to or less than 0.01 inch.

4. The adaptive surface of claim 3 wherein the dielectric surface is made of kapton.

5. The adaptive surface of claim 2 wherein the repeating pattern of electrically conductive structures comprises an array of Jerusalem crosses.

6. The adaptive surface of claim 1 further including at least one command and control unit disposed on said meta surface, the command and control unit proving energy for transmission to said plurality of rectennae via a surface wave transmission mode.

7. The adaptive surface of claim 6 wherein the at least one command and control unit includes a power amplifier to supplying said energy to an antenna associated with said at least one command and control unit.

8. The adaptive surface of claim 7 wherein the at least one command and control unit includes data transmission means for transmitting data to said plurality of actuators and to said plurality of sensors for controlling said plurality of actuators and said plurality of sensors.

9. The adaptive surface of claim 8 wherein the data transmission means of said at least one command and control unit is coupled to the antenna associated with said at least one command and control unit.

10. The adaptive surface of claim 1 wherein the plurality of rectennae supply electrical power to the plurality of sensors and the plurality of actuators.

11. An array comprising:
a metasurface capable of propagating surface waves;
a plurality of sensors and/or actuators which a user can control and/or communicate with, the plurality of sensors and/or actuators being disposed on the metasurface; and
a plurality of rectennae disposed on or within the metasurface for providing electrical power to said actuators and/or to said sensors.

12. The array of claim 11 wherein the metasurface has repeating patterns of electrically conductive geometric patterns disposed thereon or therein for transmitting surface wave to and/or from said plurality of sensors and/or actuators for coupling power and/or control functions thereto.

13. The array of claim 12 wherein the meta surface comprises a dielectric surface with said repeating patterns of electrically conductive geometric patterns disposed thereon or therein.

14. The array of claim 13 wherein the dielectric surface comprises a sheet of kapton material.

15. The array of claim 11 further including at least one command and control unit disposed on said meta surface, the command and control unit proving energy for transmission to said plurality of rectennae via a surface wave transmission mode.

16. The array of claim 15 wherein the at least one command and control unit includes a power amplifier to supplying said energy to an antenna associated with said at least one command and control unit.

17. The array of claim 16 wherein the at least one command and control unit includes data transmission means for transmitting data to said plurality of sensors and/or actuators for controlling plurality of sensors and/or actuators.

18. The array of claim 17 wherein the data transmission means of said at least one command and control unit is coupled to the antenna associated with said at least one command and control unit.

* * * * *